Patented Aug. 1, 1933

1,920,222

UNITED STATES PATENT OFFICE 1,920,222

PROCESS OF TREATING COMESTIBLES

Harden F. Taylor, Scarsdale, N. Y., assignor to The Atlantic Coast Fisheries Company, New York, N. Y., a Corporation of Maine No Drawing. Application May 9, 1928. Serial No. 276,493. Renewed December 14, 1932

30 Claims. (Cl. 99—14.)

This invention relates to comestibles and more particularly to treating fish, meats, poultry, etc. to improve their quality and prevent certain undesirable changes which may occur, especially while the goods are frozen or during storage in the frozen condition.

It is well known that, when fish, meat, etc. are frozen, if the rate of freezing is slow, crystals of ice may be formed in the frozen goods, and that the size of these crystals varies depending on the time required for freezing. When fish, etc. that have been slowly frozen and consequently contain relatively large crystals, are defrosted, juice of the fish, etc. may escape because of rupture of cell membranes and other physical changes in the morphological structure of the tissues. This has been supposed to be the most important, if not the only, cause of the loss of juice in frozen fish, meat, poultry, etc. I have found, however, that this is not true. Fish, etc., even when frozen with great rapidity and consequently having very little internal crystallization of ice, may appear a short time after having been frozen to give up or lose very little juice on being defrosted, yet if these same goods are held in the frozen condition for a protracted period, a tendency to lose juice on being defrosted is apparent. Even after two weeks in storage, this tendency in some instances may begin to be noticeable and after six weeks is often serious. As much as 20% to 25% loss in weight may occur by the loss of juice in defrosting. This loss is all the more serious in goods intended for food because the lost juice contains not only water but extractives, nutriments, flavors, etc.

Furthermore, it has been observed by me as well as by others that on prolonged storage there is developed in the tissues of fish and meat a tendency for the muscle fibers and other morphological elements to become dry, coagulated and fibrous, whereas, when fresh, they were gelatinous, colloidal and of the expected consistency of fresh tissues capable of holding in close bondage a relatively large amount of water.

I have found that I can overcome these disadvantages by treating the flesh so as to increase its pH value to such a value that the flesh will exhibit a tendency to swell and hold its water in firm bondage during defrosting even after a prolonged storage period.

In raising the pH value of the flesh, the latter may be subjected to a solution containing a buffer salt or alkali. During this treatment the rising pH value also increases the tendency of the flesh to absorb extraneous water. Since this is not desirable for obvious reasons, I have found that I can prevent the absorption of extraneous water of the circumambient solution by incorporating in the solution a substance which by osmotic pressure, prevents the entrance of water into the flesh.

Another difficulty encountered in the storage of fish, meats, etc. it the tendency to acquire an undesirable color. I have found also that I can eliminate this undesirable feature by treatment with a compound which will maintain the color the same over a protracted period.

It is, therefore, an object of this invention to provide a method of treating flesh so that, after defrosting it from a frozen state, the flesh will not lose substantially any juice containing water, extractives, nutriments, flavors and the like.

Another object of this invention is a method of treating flesh wherein the pH value of the flesh is increased to such a point that the flesh will exhibit a tendency to swell or hold water in firm bondage.

Another object of this invention is a method of treating flesh wherein the absorption of extraneous water is restrained or prevented.

A still further object of this invention is to maintain the pleasing pink color of fresh flesh and prevent any discoloration during the storage period and defrosting.

An additional object is to produce fish which will not substantially lose any of its juice or color during defrosting after protracted periods of cold storage.

In the course of extensive research work on these phenomena, including analyses, measurements of hydrogen ion concentration, etc., I have evolved an explanation in physical chemical terms of the causes of the juice-losing phenomena. This explanation is more or less theoretical, but whether it may or may not later be confirmed and verified as true, it has nevertheless led to a practical solution of the problem of maintaining the tissues of fish, meats, etc., in substantially their fresh colloidal consistency and preventing, in practice, the escape of juice during defrosting after a protracted period of storage in the frozen condition. I find that the flesh, especially the muscle tissue of many fish and animal products, is of an acid reaction, i. e., its hydrogen ion concentration is on the acid side of neutrality (pH<7.07). In cod and haddock, for example, the pH is from 6.5 to 6.9 when the fish is landed from the fishing vessel. It is an established principle in physical chemistry that protein hydrogels are at their lowest capacity to swell in water or retain water in a colloidal hydrogel when they are at their isoelectric point, and that this isoelectric point is on the acid side of neutrality. Since the tissues of fish and meat contain numerous protein substances, each having its individual isoelectric point, it may be improper to speak of an isoelectric point of fish, meat, etc., yet the pH value of the fish as a whole contains more hydrogen than hydroxyl ions and approaches the isoelectric point of some of the colloidal substances.

The remedy for the tendency of juice to separate from the colloidal substance of the tissues is, therefore, according to my invention to apply some harmless substance in regulated quantity so as to change the pH value to approximately 7, or, as required by the necessities in each substance to be treated, to a pH value of substantially increased and/or maximum tendency to swell or to hold its water in firm bondage as a hydrogel. This requires the addition of an alkaline substance or a neutral salt as a buffer which is able to change the pH value as required. In fish I have found the following substances among others to be suitable, viz., tri-sodium citrate, tri-sodium phosphate, sodium carbonate, sodium bicarbonate, sodium hydroxide or the corresponding potassium and ammonium derivatives. Preferably, these salts are made into aqueous solutions and the fish subjected thereto.

Where any of these substances are used in solution, the concentration required to adjust the pH value as desired may be too low in an osmotic sense to prevent the undue absorption of water from the solution by the fish. The rising pH value increases the tendency to hold and also to absorb water from the circumambient solution.

Since the purpose of the invention is usually not to cause the absorption of extraneous water but to cause the tissues to retain firmly that which they naturally have, I find it desirable to restrain this absorption of extraneous water by the addition of a neutral, harmless substance or salt which by osmotic pressure prevents the entrance of the water into the fish. That is to say, the tendency of the tissues to absorb water from a circumambient brine caused by the rising pH value of the tissues is substantially neutralized by the tendency of the water in the tissues to exosmose to the relatively concentrated salt solution. Various substances and salts may be used to effect this desideratum. I have found that I can obtain satisfactory results with sodium chloride.

I, therefore, use in practice a solution of a harmless substance capable of raising the pH value of the tissues being treated to a point of greater or increased tendency to swell and hold water which they naturally have and sodium chloride in sufficiently high concentration to prevent the absorption of an excessive quantity of water by the fish, meat, etc. These substances are dissolved in water and used as a brine with which to treat the fish, etc., for a measured length of time to change the pH value, as required for the particlar class of goods being treated. Naturally, the proportions of the two chemical substances will vary with respect to each other and both substances as well as the time of treatment will vary with the fish, etc., to be treated.

Another difficulty that is encountered in the storage of fish, meat, etc. is the tendency to acquire an undesirable color. This is due according to my observations to changes in the hemoglobin of the tissues. In cod and haddock and many other fish, when fresh, there is a pleasing pink color due to the fresh hemoglobin or oxyhemoglobin. In prolonged standing this is converted to methemoglobin or other discolored hemoglobin derivatives. I have found that I can maintain the pleasing pink color of fresh fish for a protracted period of time by treating the fish with a suitable nitrite. Therefore, in combination with the substances in the brine already referred to, I add sodium nitrite in a quantity just sufficient to hold the coloring pigments of the fish, etc. in their natural pink condition. The effectiveness of the nitrite is improved when used in connection with an alkaline substance or when the pH value is kept less acid or more alkaline than naturally prevails in fish or meat, etc. It is, therefore, part of this invention to use sodium, potassium or other suitable nitrite in connection with a substance capable of raising the pH value of the flesh treated. The alkaline or buffer salt referred to above, therefore, serves the double purpose of preventing separation of juice from the fish or meat after a period in the frozen condition and favoring the action of nitrites in maintaining the natural color of the fish, meat, etc.

As pointed out above, the pH value of the fish landed and the pH value indicating the maximum and/or increased tendency to swell or hold water in firm bondage may vary in the different classes or kinds of fish. It is, however, obvious that these values and especially the latter in any fish may be readily determined. The following example, which is applicable to cod and haddock, is merely illustrative of a single embodiment of my invention and in no way limitative of my invention.

In carrying out my method, I subject the fish, after determining its pH value, to a brine containing the three ingredients above described. I permit the fish to remain in contact with this brine until it has acquired the desired pH value. I then remove the fish, freeze it and either store or distribute the fish as desired.

Various concentrations of brine to effect the desideratum may be used. I have found that brines containing the following ingredients in approximately the following proportions by weight give satisfactory results:

| | |
|---|---|
| Sodium chloride | 5%–15% |
| Alkali (or buffer as the case may be) | $\frac{N}{20} - \frac{N}{5}$ |
| Sodium nitrite | 0.06%–.06% |

Preferably, I use the following formula:

| | |
|---|---|
| Sodium chloride | 10% |
| Alakli (or buffer as may be required) | $\frac{N}{10}$ |
| Sodium nitrite | .06% |

In the claims the expression "alkaline substance" is used to designate both buffer salts and/or alkali, as above set forth.

The term "flesh" employed in the claims is intended to cover and include the meat portion of comestibles of animal origin having internal skeletons and hemoglobin in the blood, such as fish, meat, poultry, etc.

It is obvious that various modifications may be made in the above-described details, as for instance, the proportions of the various ingredients changed and the fish treated with the nitrite separately and not simultaneously, as above described, without changing the nature of the invention. I, therefore, do not intend to limit myself to the exact details above-described except as defined in the appended claims.

I claim:

1. A method of treating flesh which comprises changing the pH value of the flesh to such a value that the flesh will exhibit a substantially increased tendency to hold its water in firm bondage.

2. A method of treating flesh which comprises subjecting said flesh to a solution containing an alkaline substance whereby the pH value of said flesh is changed to such a value that the flesh will exhibit a substantially increased tendency to hold its water as a hydrogel.

3. A method of treating fish which comprises changing the pH value of the fish to such a value that the fish will exhibit a substantially increased tendency to hold its water in firm bondage.

4. A method of treating fish which comprises subjecting said fish to a solution containing an alkaline substance whereby the pH value of said fish is changed to such a value that the fish will exhibit a substantially increased tendency to hold its water as a hydrogel.

5. A method of treating fish which comprises changing the pH value of said fish to approximately 7 and freezing said fish.

6. A method of treating fish which comprises subjecting said fish to a solution containing an alkaline substance whereby the pH value of said fish is changed to approximately 7 and freezing said fish.

7. A method of treating flesh which comprises subjecting said flesh to a solution containing an alkaline substance and sodium chloride whereby the pH value is increased to such a value that the flesh will exhibit a substantially increased tendency to hold its water in firm bondage without any substantial absorption of extraneous water and freezing said flesh.

8. A method of treating flesh which comprises subjecting said flesh to a solution containing an alkaline substance and an agent adapted to prevent the absorption of any substantial extraeous water whereby the pH value of said flesh is increased to such a value that said flesh will exhibit a substantially increased tendency to hold its water and freezing said flesh.

9. A method of treating fish which comprises subjecting said fish to a solution containing an alkaline substance and sodium chloride whereby the pH value is increased to such a value that the fish will exhibit a substantially increased tendency to hold its water without any substantial absorption of extraneous water and freezing said fish.

10. A method of treating fish which comprises subjecting said fish to a solution containing an alkaline substance and an agent adapted to prevent the absorption of any substantial extraneous water whereby the pH value of said fish is increased to such a value that said fish will exhibit a substantially increased tendency to hold its water and freezing said fish.

11. A method of treating fish which comprises subjecting said fish to a solution containing an alkaline substance whereby the pH value of said fish is increased to approximately 7, and an agent adapted to prevent the absorption of any substantial amount of extraneous water, and freezing said fish.

12. A method of treating fish which comprises subjecting said fish to a solution containing an alkaline substance and sodium chloride whereby the pH value is increased to approximately 7 without any substantial absorption of extraneous water and freezing said fish.

13. A method of treating fish which comprises subjecting said fish to a solution containing the following ingredients in approximately the proportions given by weight: sodium chloride 5%–15%, alkaline substance $\frac{N}{20}-\frac{N}{5}$ and sodium nitrite .06% and freezing said fish.

14. A solution for treating flesh comprising sodium chloride 5% to 15% and an alkaline substance $\frac{N}{20}-\frac{N}{5}$.

15. A solution for treating fish comprising sodium chloride 5%–15%, alkaline substance $\frac{N}{20}-\frac{N}{5}$ and sodium nitrite .06%.

16. Flesh of dead animals having a pH of such value that it will exhibit a substantially increased tendency to hold its water in firm bondage.

17. Meat of dead fish having a pH of such value that it will exhibit a substantially increased tendency to hold its water in firm bondage.

18. Flesh of dead fish having a pH value of approximately 7 and exhibiting a substantially increased tendency to hold its water in firm bondage.

19. A method of treating flesh which comprises subjecting said flesh to the joint action of an agent which changes the pH value thereof to such a value that the flesh will exhibit an increased tendency to hold its water in firm bondage and an agent which prevents any substantial absorption of water.

20. A method of treating flesh which comprises subjecting said flesh to the joint action of an alkaline substance and sodium chloride, whereby the pH value thereof is changed to such a value that the flesh will exhibit an increased tendency to hold its water in firm bondage without any substantial absorption of water.

21. A method of treating fish which comprises subjecting said fish to the joint action of an agent which changes the pH value thereof to such a value that the fish will exhibit an increased tendency to hold its water in firm bondage and an agent which prevents any substantial absorption of water.

22. A method of treating fish which comprises subjecting said fish to the joint action of an alkaline substance and sodium chloride, whereby the pH value thereof is changed to such a value that the fish will exhibit an increased tendency to hold its water in firm bondage without any substantial absorption of water.

23. A method of treating flesh which comprises subjecting flesh to a brine containing alkali nitrite and an alkaline substance, whereby the pH value of the flesh is changed to such a value that said flesh will exhibit a substantially increased tendency to hold its water in firm bondage and its pleasing fresh color capable of being maintained for a protracted period, and freezing said flesh.

24. A method of treating fish which comprises subjecting fish to a brine containing alkali nitrite and an alkaline substance, whereby the pH value of the fish is changed to such a value that said fish will exhibit a substantially increased tendency to hold its water in firm bondage and its pleasing fresh color capable of being maintained for a protracted period, and freezing said fish.

25. A method of treating flesh which comprises changing the pH value of the flesh to such a value that the flesh will exhibit a substantially increased tendency to hold its water in firm bondage, and freezing said flesh.

26. A method of treating flesh which comprises subjecting said flesh to a solution containing an alkaline substance whereby the pH value of said flesh is changed to such a value that the flesh will exhibit a substantially increased tendency to hold its water as a hydrogel, and freezing said flesh.

27. A method of treating fish which comprises changing the pH value of the fish to such a value that the fish will exhibit a substantially increased tendency to hold its water in firm bondage, and freezing said fish.

28. A method of treating fish which comprises subjecting said fish to a solution containing an alkaline substance whereby the pH value of said fish is changed to such a value that the fish will exhibit a substantially increased tendency to hold its water as a hydrogel, and freezing said fish.

29. A method of treating flesh which comprises subjecting said flesh to the joint action of an agent which changes the pH value thereof to such a value that the flesh will exhibit an increased tendency to hold its water in firm bondage and an agent which prevents any substantial absorption of water, and freezing said flesh.

30. A method of treating fish which comprises subjecting said fish to the joint action of an agent which changes the pH value thereof to such a value that the fish will exhibit an increased tendency to hold its water in firm bondage and an agent which prevents any substantial absorption of water, and freezing said fish.

HARDEN F. TAYLOR.